Patented Sept. 18, 1928.

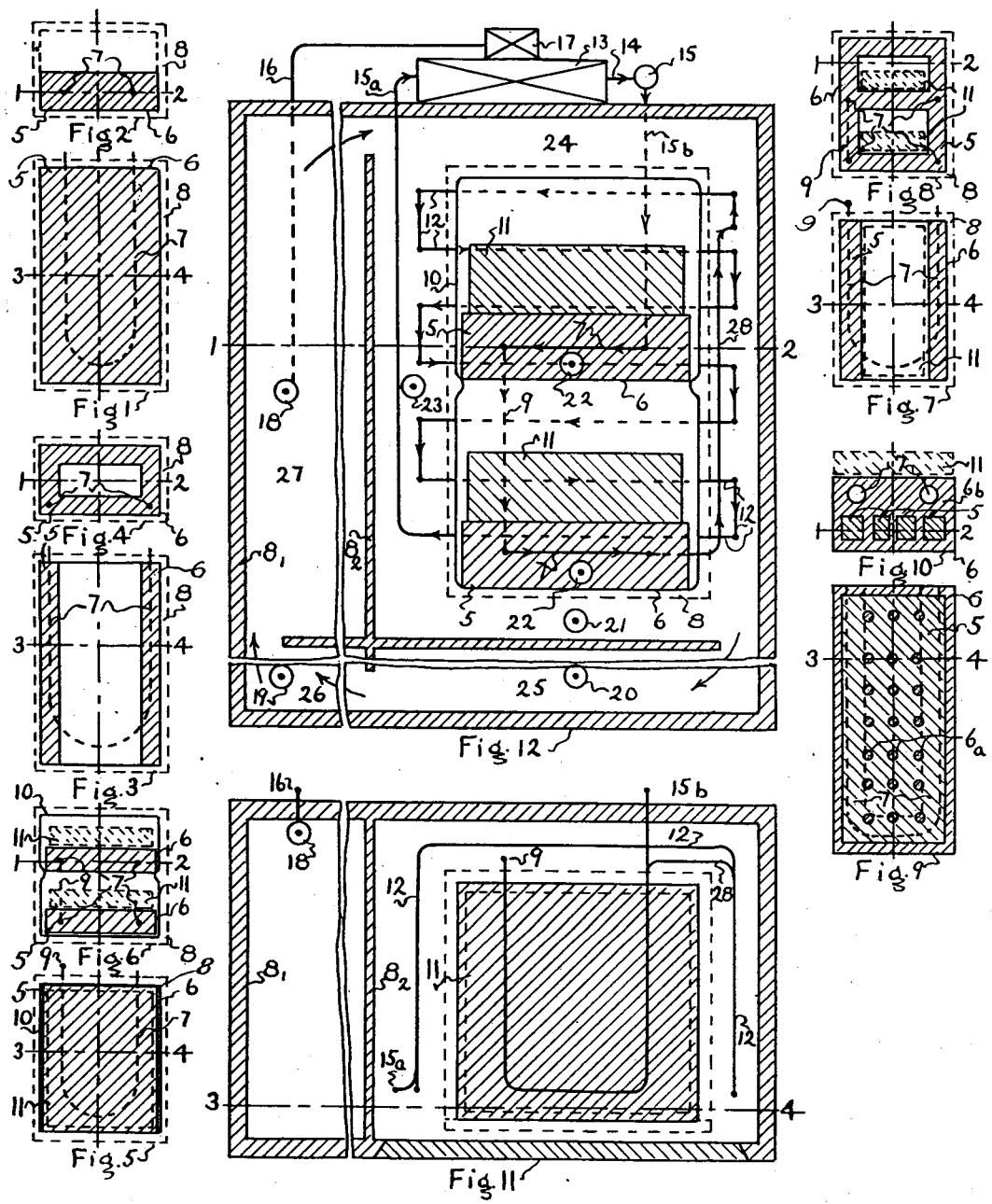

1,684,423

UNITED STATES PATENT OFFICE.

GARDNER TUFTS VOORHEES, OF BOSTON, MASSACHUSETTS.

PROCESS AND APPARATUS FOR REFRIGERATION.

Application filed November 29, 1920. Serial No. 427,144.

My invention relates to improvements in cooling and freezing processes and apparatus involving the use of latent heat of fusion of a substance having a lower freezing and melting point than that of a substance which it is to cool or freeze. This is accomplished by the use of one or more refrigerating elements containing a suitable latent heat of fusion substance.

In the accompanying drawings all of which are diagrammatic, the figures are arranged in groups of two, the two figures of a group are connected by vertical center lines, the lower figure of a group being a section of the upper figure on line 1, 2 and the upper figure of a group being a section of the lower figure on line 3, 4.

Figures 1, 2 3, 4 9, 10 show various forms of a refrigerating element. Figures 5, 6 7, 8 show a pair of refrigerating elements, and some uses therefor. Figs. 11, 12 show a household refrigerator equipped with a pair of refrigerating elements together with other apparatus. Figs. 9, 10 show a special form of a quick acting refrigerating element.

In all the figures, 5, is a latent heat of fusion substance, such, for example, as a solution of a salt in water, or any other desired substance having latent heat of fusion, 6 is a container for the latent heat substance, 7 is a refrigerant conduit, 8 is insulation, 11 is a substance to be cooled or frozen or both or to be maintained cooled or frozen or both. Figures 1 and 2 show a rectangular refrigerating element. From this it is evident that a refrigerating element could have any desired shape or size. Each of these refrigerating elements of Figs. 1 to 8 inclusive may or may not be equipped with a refrigerating conduit 7 and may or may not be partially or entirely encompassed by insulation 8. Each of these refrigerating elements from Figs. 1 to 8 inclusive contains a latent heat of fusion substance 5, in its casing 6. The latent heat of fusion substance 5 may be frozen by the exposure of its container 6 to a sufficiently cold means, or it can have its refrigerating conduit 7 cooled by a refrigerant circulating therein or therethrough to freeze the latent heat of fusion substance 5 therein.

The partial or total freezing of this latent heat of fusion substance causes a comparatively small weight thereof to have a much greater capacity to take up heat and so do more refrigeration than would a very much larger weight of a non-latent heat of fusion substance. For example, suppose a brine solution has a specific heat of .8 for its liquid state and .4 for its solid state and a latent heat of fusion of 130, all in B. t. u.'s per pound of weight. If it were desired to store up refrigerating capacity in this brine with an allowable range of temperature thereof of 10° F. we could only store up 8 B. t. u.'s of refrigeration if as is commonly done we only used the specific heat of the liquid brine. But if we not only used the specific heat of the liquid of this brine but also used its latent heat of fusion and its specific heat of solid between the same 10° range of its temperature it would store up an ability to perform 143 B. t. u. of refrigeration. Or 80 times as much refrigeration as was stored up by the same weight of liquid brine.

A latent heat of fusion substance, for use in this invention, must be properly selected for its desired freezing and melting point, if it is a simple substance or must be prepared by making a suitable concentration of a salt and water if it is a compound latent heat of fusion substance. When using a salt solution for such a latent heat of fusion substance I find that it has not a fixed freezing point but that it begins to thicken up at a certain temperature as its temperature is reduced and finally becomes solid at a still lower temperature, so that such a brine mixture may have what may be called an average freezing or melting point derived from the temperatures at which it begins to thicken and becomes solid. Now if we had a suitable weight of a suitable latent heat of fusion substance in a suitable size of any of the refrigerating elements of Figs. 1 to 8 inclusive, in a frozen condition, we could use such an element for cooling or freezing any desired substance or for holding any desired substance cooled or frozen. For example any one of these elements may cool surrounding air or any substance in contact therewith or it may be encased in insulation and may cool any substance contained in the insulating container. With sufficient insulation any substance could be held cooled or frozen or both for a considerable period of time. The containers 6 of Figs. 1 to 8 inclusive should be adapted to take care of the expansion of the latent heat substance 5 when it changes from a liquid to a solid state. I provide for this in the shape of the container or by not filling it quite full of the latent heat substance 5 in its liquid state or by corrugating one or more of its surfaces, etc.

Two or more refrigerating elements of Figs. 1 and 2 can be used in conjunction. Two such elements are shown in Figs. 5 and 6. They may be arranged in any desired manner as for example, in a casing 10. Two or more of such elements, with their latent heat substance 5, frozen, could be inserted in any desired refrigerator to cool it. Or they could be insulated by insulation 8 and could maintain a substance 11, such for example, as ice cream or ice in a frozen condition. Or if provided with refrigerating conduits 7, 7 connected together by conduit 9, they could by the circulation of a refrigerating fluid therethrough have the latent heat substance 5 frozen and could make the pans of water 11 freeze into ice when the refrigerating fluid was not circulated through the conduit 7, 7 for some considerable intermittent periods. In Figs. 5, 6 the upper side of the refrigerating conduit 7 should preferably contact with the under side of the upper surface of the container 6 that makes contact with the under side of the pan of water to be frozen 11. In the construction shown in Figs. 5 and 6 I find that a pan 11 of warm water will draw so heavily on the latent heat substance 5 that its temperature will be raised so that the freezing of ice in pan 11 is not as prompt as it will be if the construction shown in Figs. 9 and 10 were used. The refrigerating element of Figs. 9, 10 has conduction pieces 6$^a$ under the conduction part 6$^b$ surrounding refrigeration conduit 7. The conduction pieces 6$^a$ or their equivalent tend to more quickly freeze the latent heat of fusion substance 5 because of the greater heat conducting contact therefrom and because of lessening the insulating effect of partly frozen substance 5 or unfrozen substance 5 that is to be frozen. In this construction the underside of water pan 11 will start off colder and so freeze the ice more promptly than will the construction shown in Figs. 5 and 6. In Figs. 9 and 10 the conduction part 6$^b$ may be transmitting heat to the refrigerating fluid in conduit 7, both from the pan of water or water and ice 11 and from the latent heat substance 5 and when the refrigerating fluid is not acting in conduit 7 heat may flow through 6$^b$ from 11 to 5 to continue the freezing in 11 or to hold ice or other substance 11 in a frozen or cooled condition. Primary refrigerant conduit 7 constitutes one chamber and latent heat of fusion substance space 5 constitutes another chamber and portions 6$^a$ 6$^b$ of the element serve as heat conductors for the heat conducting cooperation of chambers 5 and 7, one with the other and with ice pan 11.

In Figs. 7 and 8 a compound freezing element somewhat like the single one of Figs. 3 and 4, is used similarly as were the refrigerating elements of Figs. 5 and 6.

Two or more refrigerating elements of Figs. 1 and 2 as combined in Figs. 5 and 6 can be used either inside or outside of a household refrigerator, as shown inside one in Figs. 11 and 12. If placed inside the refrigerator they may operate to cool the refrigerator by taking in the latent heat into 5 that may have been taken out outside the refrigerator. Or they may cool the refrigerator by means of their coils 7, 7 connected together by conduit 9 or they may cool the refrigerator and maintain any substance as ice cream bricks 11, 11 in a cooled or frozen condition or they may cool the refrigerator and freeze pans of water 11, 11 into ice or they may be insulated by insulation 8 so that they do little or no cooling of the refrigerator itself. The refrigerator may also be provided with a coil 12 which may do most of the cooling of the refrigerator itself or may be assisted therein by the refrigerating elements themselves either insulated or uninsulated as may be desired. The refrigerating coil 12 may use the refrigerant either before or after it passes through the refrigerating elements. When the refrigerating elements are in the refrigerator the preferred form of construction is with insulation 8 around the refrigerating elements and with the refrigerant first going through these elements and then through the refrigerating coil 12. The refrigerating fluid may be of any desired kind from any desired source and is here shown as coming from a refrigerating machine 13 that may be either manually or automatically started and stopped. In the preferred form of operation the action is as follows: A liquid refrigerant, such for example as liquid ammonia, flows from refrigerating machine 13 via conduit (14) to automatic expansion valve 15 which maintains a practically constant pressure at its outlet, when the machine 13 is in steady operation, the refrigerant from expansion valve 15 flows through the coils 7, connected by conduit 9, through the refrigerating elements and from them via conduit 28 to the top of and down through the refrigerating coil 12 and out therefrom via conduit 15$^a$ into refrigerating machine 13 where it is reliquefied. Pans of water 11, 11 are inserted on the refrigerating elements and are frozen into ice thereby. The air in the refrigerator flowing from compartment 24 via compartment 25, 26, 27 back to compartment 24 by natural circulation, 27 being the hottest compartment. A thermostat 18 in warmest compartment 27 acting to start and stop refrigerating machine 13 via connection 16 through means 17. The refrigerating machine 13 is usually stopped when the temperature of compartment 27 is 44° F. and is usually started again when the temperature in 27 has risen to 46°. The cold air in the coldest compartment 25 should not get below 34° so as not to freeze food products contained therein. The reserve or storage refrigerating capacity in the latent heat substance 5 of the refrigerating elements causes water in pans 11, 11 to freeze into ice and to maintain said ice in a frozen condition even though there are prolonged shut downs of the refrigerating machine 13. It is further evident that with this construction that the refrigerant fluid must first cope with the latent heat substance 5 before it materially cools coil 12. Furthermore this construction, particularly when riser 28 has a sufficiently small cross section, has valuable practical features in causing oil in a refrigerant to travel up 28 and so not block up coil 7, 7. The same result is achieved when conduit 15$^a$ is of sufficiently small cross section to get rid of the oil that would otherwise tend to block up coil 12. The cross-sectional area of these pipes 28 and 15$^a$, should be such as will cause the oil to rise up in them because of the velocity therein, rather than to have the refrigerant pass up through the oil and so leave it behind. The starting and stopping of the refrigerating machine 13 could be governed not only by having a thermostat placed at 18 but it could also have it placed at 19, 20, or 21 or at 22, in either or both of the refrigerating elements or at 23 in the return pipe 15$^a$ or by a combination thereof. When any one of these other thermostats act, in place of 18, the result is as follows:—
Thermostat 19 or 20 or 21 act like 18, except the temperature of the air in a different part of the refrigerator becomes the controlling factor. When one or more of the thermostats 22 are used, the temperature of the latent heat of fusion substance becomes the controlling factor. When thermostat 23 is used, either the pressure or temperature in 15$^a$ causes it to be the controlling factor. A combination of these various thermostats will obviously give a combination of the above results. For example, if 18, 22, 23 were all in use, then the compressor would start or stop if the air temperature of the refrigerator at 18 was above or below desired temperatures and the compressor would start or stop if the temperature of the latent heat of fusion substance was above or below the desired temperatures and the compressor would start or stop if the suction pressure was above or below desired pressures or if the temperature of the refrigerant fluid was above or below desired temperatures. When 18 or 19 or 20 do not help control the starting and stopping of the compressor, then with 22 controlling, the temperature of the air in the refrigerator is governed by several factors and its temperature is usually a more or less constant temperature difference below the temperature of the air outside of the refrigerator. A somewhat similar action occurs when only 23 governs. Also the magnitude of the various surfaces of the various cold parts and the refrigerator walls and their insulation and arrangement all have a modifying action on the temperature of the air in the refrigerator. It has been found that it is difficult to get sufficient cooling surface into compartment 24 if a tank full of liquid brine is used for the cooling means, also that such a tank requires a lower refrigerant pressure than does a direct expansion coil 12, and it is well known that a lower refrigerant pressure curtails both the capacity and economy of a refrigerating machine. It is also found that if cans of water were placed on a direct expansion coil like 12 but adjusted to make contact with them that the water will not freeze and that the ice will melt during the shut down periods unless compartment 24 is uneconomically maintained at a temperature less than 32°. Furthermore the construction here shown is of further great practical value intending to have the frost on coil 12 melt off during shut down periods and so prevent uneconomical heavily frosted surfaces.

Under this invention, the relative relationship of the direct expansion coil 12 and the refrigerating elements 5, 6, 7, may be varied as desired. I prefer the relative relationship shown in Figs. 11, 12, because downward flow of the refrigerant liquid through the refrigerating elements and then down through the direct expansion coil, that directly cools the air of the refrigerator, insures the refrigerating elements in getting refrigeration before the refrigerant goes to the direct expansion coil, also direct expansion coil is frosted, first at top, and if enough liquid is fed, is frosted throughout, where it is most effective and a minimum charge of liquid refrigerant is required because of the downward expansion and a drier refrigerant suction is assured, whereas with upward expansion in the direct expansion coil, it is difficult to frost the coil throughout, without an excess liquid charge and without the liquid slopping over to the compressor, and I have found this arrangement to be simple as to cost and installation and satisfactory for the purposes desired.

In the claims, where I refer to the circulation, or to the refrigerating circulation of the primary refrigerant, I refer to that circulation, directly or indirectly caused because of the operation of a compressor or its equivalent. I believe that I am entitled to the broadest possible interpretation of this process and apparatus, and because of the intimate relation between process and apparatus I wish to claim both in a single application.

What I wish to claim is as follows:—

1. A process of cooling a storage space which consists of confining within said space a mass of water and a second mass of latent heat of fusion liquid having a lower freezing point than water in heat exchanging relation with each other, circulating a primary refrigerant in heat exchanging relation to the latent heat of fusion liquid until both liquid masses are all or partly frozen and then, when the refrigerant's circulation is stopped, preventing the all or partly frozen water from melting and maintaining the air within the storage space in a cold condition by the latent heat of said second all or partly frozen liquid.

2. In an intermittently operated refrigerating system the process of maintaining a refrigerator between certain temperature limits and of freezing and holding ice frozen by the circulation of a primary refrigerant fluid in heat conducting contact with a latent heat of fusion substance that is in heat conducting contact with the freezing or frozen ice and in heat conducting contact with the air of the refrigerator and causing refrigerating circulation of the refrigerating fluid to stop before the refrigerator reaches its lower temperature limit and to start before it reaches its upper temperature limit.

3. In an intermittently operated refrigerating system the process of maintaining a refrigerator between certain temperature limits and of freezing and holding ice frozen by the circulation of a primary refrigerant fluid in heat conducting contact with a latent heat of fusion substance, inside of and insulated from said refrigerator, that is in heat conducting contact with the freezing or frozen ice and in heat conducting contact with the air of the refrigerator and causing refrigerating circulation of the refrigerating fluid to stop before the refrigerator reaches its lower temperature limit and to start before it reaches its upper temperature limit.

4. In an intermittently operated refrigerating system the process of maintaining a refrigerator between certain temperature limits and of freezing and holding ice frozen by the circulation of a primary refrigerant fluid in heat conducting contact with a latent heat by fusion substance that is in heat conducting contact with the freezing or frozen ice and in heat conducting contact with the air of the refrigerator and automatically interrupting the circulation of the primary refrigerant before the temperature of the refrigerator reaches a predetermined low limit and starting it again before it reaches a given high limit.

5. The process of simultaneously conducting heat to a primary refrigerant from a body of water, to cause it to freeze and from a latent heat of fusion substance, to cause it to freeze and then conducting heat to said latent heat of fusion substance from said body of water to cause said substance to thaw and to cause said water to freeze and to prevent said frozen water from thawing.

6. In an ice-making system the combination of one or more refrigerating elements containing a latent heat of fusion substance and a primary refrigerant conduit with one or more cans of water to be frozen and with a refrigerating machine adapted to circulate a refrigerant fluid through said conduit, said latent heat of fusion substance being adapted to be alternately frozen by a primary refrigerant and thawed by water being frozen, said conduit and said substance being in heat conducting contact with each other and said element or elements being in heat conducting contact with said can or cans.

7. A heat conducting element, adapted for heat conducting contact with an ice mould, and composed of two chambers in heat conducting contact, one chamber being adapted for the circulation of a refrigerant fluid therethrough and the other chamber being adapted to contain a latent heat of fusion substance, portions of said element extending into the latent heat of fusion chamber, said latent heat of fusion substance being adapted to be alternately frozen by a primary refrigerant and thawed by water being frozen.

8. A metallic heat conducting element, adapted for heat conducting contact with an ice mould, and composed of two chambers in heat conducting contact, one chamber being adapted for the circulation of a refrigerant fluid therethrough and the other chamber being adapted to contain a latent heat of fusion substance, portions of said element extending into the latent heat of fusion chamber, said latent heat of fusion substance being adapted to be alternately frozen by a primary refrigerant and thawed by water being frozen.

9. A heat conducting element adapted for heat conducting contact with an ice mould, and composed of two chambers in heat conducting contact, one chamber being adapted for the circulation of a refrigerant fluid therethrough and the other chamber containing a latent heat of fusion substance, portions of said element extending into the latent heat of fusion chamber, said latent heat of fusion substance being adapted to be alternately frozen by a primary refrigerant and thawed by water being frozen.

10. A metallic heat conducting element, adapted for heat conducting contact with an ice mould, and composed of two chambers in heat conducting contact, one chamber being adapted for the circulation of a refrigerant fluid therethrough and the other chamber containing a latent heat of fusion substance, portions of said element extending into the latent heat of fusion chamber, said latent heat of fusion substance being adapted to be alternately frozen by a primary refrigerant and thawed by water being frozen.

11. In an intermittently operated refrigerating system, the process of holding ice cream in a desired state by the circulation of a refrigerant fluid in heat conducting contact with a latent heat of fusion substance, adapted to be alternately frozen and thawed, that is in heat conducting contact with the ice cream and automatically interrupting the circulation of the refrigerant fluid when the temperature of the latent heat of fusion substance reaches a predetermined low limit and starting it again when it reaches a given high limit.

GARDNER TUFTS VOORHEES.